Patented July 20, 1943

2,325,014

UNITED STATES PATENT OFFICE 2,325,014

COMPOSITION AND COATED ROD FOR ARC WELDING MAGNESIUM ALLOYS

James J. Prendergast, Bay City, Ronald A. Jones, Midland, and Carl F. Gladen, Bay City, Mich., assignors to The Dow Chemical Company, Midland, Mich., a corporation of Michigan No Drawing. Application March 25, 1942, Serial No. 436,174

4 Claims. (Cl. 219—8)

This invention relates to a composition for use in electric-arc welding magnesium and magnesium-base alloys. It also concerns magnesium and magesium-base alloy weld-rods coated with the composition.

The fabrication of articles of magnesium and magnesium-base alloys by electric arc-welding procedures has heretofore been considered impracticable because of the extreme tendency of magnesium to oxidize at welding temperatures. It has been postulated from time to time that this difficulty could be overcome by the use of some type of protective flux, but no satisfactory flux composition has heretofore been available.

The principal object of the present invention is to provide a composition which serves satisfactorily as a flux and weld-rod coating and which permits successful fabrication of magnesium and magnesium-base alloy articles by arc-welding methods.

This object is attained in the compositions of the invention which consist essentially of mixtures of alkali metal halides, these mixtures being composed of the elements potassium, sodium, and lithium in chemical combination with the elements chlorine and fluorine, such elements being present in combined form in approximately the following proportions:

K---10 to 25 atomic per cent  
Na-10 to 35 atomic per cent   } Total: 50 atomic per cent  
Li---5 to 15 atomic per cent Cl-30 to 40 atomic per cent  } Total: 50 atomic per cent  
F---10 to 20 atomic per cent and the fluorine being present in a proportion substantially in excess of that equivalent to the lithium.

The chemical identity of the individual alkali metal halides used in making the new composition is not critical, provided these constituents are present in relative amounts such as to produce a composition having an ultimate analysis within the limits given. This fact will be evident when it is recalled that the alkali metal halides, in the fused state or in solution, are ionized to a high degree, and hence are largely interconvertible at the temperatures under which the compositions of the invention are used. In consequence, compositions according to the invention having the same elemental analysis behave in substantially similar manner, regardless of the identity of the individual alkali halides added. For example, the sodium content may be added as sodium chloride, sodium fluoride, or a mixture of these, provided only that the other alkali halides present are of such nature and in such amounts as to bring the entire composition within the proportional limits stated.

While, so far as known, all alkali halide mixtures having compositions within the range given are operable in arc-welding magnesium and its alloys, the following mixture, having a fusion temperature of about 1125° F., has been found particularly effective:

|  | Parts by weight | Mol per cent |
|---|---|---|
| Potassium chloride | 40 | 32.1 |
| Sodium chloride | 30 | 30.7 |
| Sodium fluoride | 10 | 23.0 |
| Lithium fluoride | 10 | 14.1 |

In preparing the composition, these ingredients, preferably in the anhydrous state, are fused together to form a homogeneous mixture, which is then cooled until it solidifies, after which it may be ground to a powder.

In utilizing the new compositions in arc-welding, an arc is struck and maintained between the magnesium or magnesium-base alloy work and a magnesium or magnesium-base rod, and the flux composition is supplied continuously to the arc zone as the welding proceeds, most conveniently by coating the weld-rod with the composition prior to use.

In providing a coating, the anhydrous alkali halide flux composition of the invention is mixed with a limited proportion of water to form a thin paste, e. g. by mixing 1.0 pound of the preferred composition given above with 7.5 fluid ounces of water. The bare magnesium or magnesium-base allow weld-rod to be coated is dipped in the paste and is then removed and heated to dry out water from the adhering paste layer. This dipping and drying is carried out repeatedly until an even coating of satisfacatory thickness, usually 0.06 inch or more, is formed. Drying temperatures of 250° to 300° F. and drying times of an hour or more are customary.

Weld-rods coated as just described may be used satisfactorily in arc welding magnesium and magnesium-base alloys according to manipulative procedures similar to those used in arc-welding other metals. Direct current arcs, with either standard or reversed polarity, and alternating current arcs may be used. In general, with direct current, an open circuit potential of about 50 volts and a welding current of roughly 60 amperes are convenient. Best results are obtained when the magnesium or magnesium-base alloy work is at least 0.25 inch thick.

The compositions of the invention, and the coated weld-rods, exhibit a number of significant advantages. The composition, when applied to the rod, forms a smooth, even, and hard coating. During welding, the composition flows from the rod at a rate sufficient to cover the weld area effectively and yet does not feed so rapidly as to quench the arc. The composition spreads evenly over the molten metal and protects it against oxidation by the atmosphere without itself attacking the metal. After welding, the composition and included slag are easily removed from the weld bead, leaving clean metal containing little included flux.

We claim:

1. A composition for use in arc-welding magnesium and magnesium-base alloys consisting of a mixture of alkali metal halides composed of the elements potassium, sodium, and lithium in chemical combination with the elements chlorine and fluorine, the said elements being present in combined form in approximately the proportions:

K--10 to 25 atomic per cent  
Na--10 to 35 atomic per cent  } Total: 50 atomic per cent  
Li--5 to 15 atomic per cent  
Cl--30 to 40 atomic per cent  } Total: 50 atomic per cent  
F--10 to 20 atomic per cent and the fluorine being present in a proportion substantially in excess of that equivalent to the lithum.

2. A composition for use in arc-welding magnesium and magnesium-base alloys consisting of a mixture substantially identical with that produced by fusing together the following salts in approximately the proportions given:

| | Parts by weight |
|---|---|
| Potassium chloride | 40 |
| Sodium chloride | 30 |
| Sodium fluoride | 10 |
| Lithium fluoride | 10 |

3. An electric arc weld-rod comprising a magnesium or magnesium-base alloy rod provided with a coating consisting of a mixture of alkali metal halides composed of the elements potassium, sodium, and lithium in chemical combination with the elements chlorine and fluorine, the said elements being present in combined form in approximately the proportions:

K--10 to 25 atomic per cent  
Na--10 to 35 atomic per cent  } Total: 50 atomic per cent  
Li--5 to 15 atomic per cent  
Cl--30 to 40 atomic per cent  } Total: 50 atomic per cent  
F--10 to 20 atomic per cent and the fluorine being present in a proportion substantially in excess of that equivalent to the lithium.

4. An electric arc weld-rod comprising a magnesium or magnesium-base alloy rod provided with a coating consisting of a mixture substantially identical with that produced by fusing together the following salts in approximately the proportions given:

| | Parts by weight |
|---|---|
| Potassium chloride | 40 |
| Sodium chloride | 30 |
| Sodium fluoride | 10 |
| Lithium fluoride | 10 |

RONALD A. JONES.  
CARL F. GLADEN.  
JAMES J. PRENDERGAST.